Aug. 21, 1956  P. M. LEMOIGNE  2,759,694
PARACHUTE CANOPY
Filed Jan. 10, 1955  2 Sheets-Sheet 1

Inventor
P. M. Lemoigne
By Glascot Downing Seebus
Attys

Aug. 21, 1956 P. M. LEMOIGNE 2,759,694
PARACHUTE CANOPY
Filed Jan. 10, 1955 2 Sheets-Sheet 2
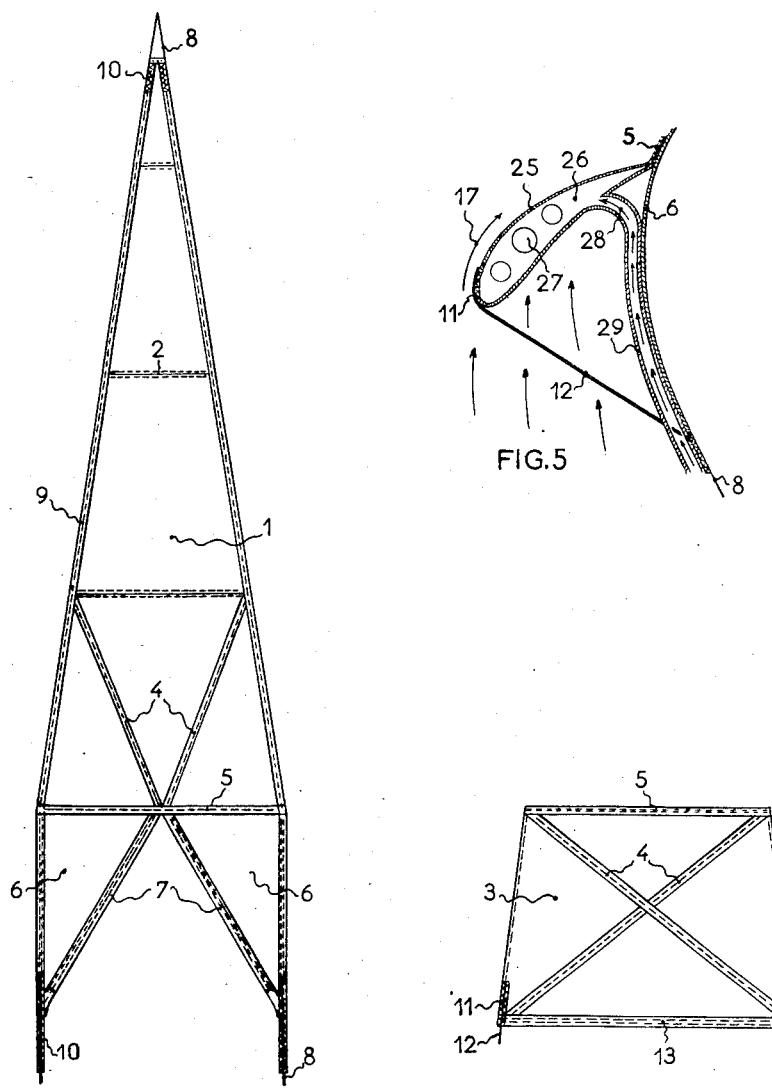
Inventor
P. M. Lemoigne
By Glascock Downing Seebold
Attys.

United States Patent Office 2,759,694
Patented Aug. 21, 1956

---

2,759,694

PARACHUTE CANOPY

Pierre Marcel Lemoigne, Montrouge, France

Application January 10, 1955, Serial No. 480,969

Claims priority, application France January 15, 1954

3 Claims. (Cl. 244—145)

This invention relates to parachutes for aviation and like purposes.

A parachute canopy usually offers, in its fully spread state, between its circular section of maximum area and its leading edge, a marginal surface which is drawn inwardly under the pulling action of the shroud lines, which increases the boost of pressure under the canopy, upon opening of the same by opposing lateral escape of air from the canopy.

Moreover, the said marginal surface has for its only useful function to ensure a mechanical interconnection between the shroud lines and the cup-like upper portion of the canopy above the said circular section of maximum area, which is the only active part of the same.

Furthermore, to obtain a suitable spreading of the canopy, the shroud lines are necessarily provided at comparatively close intervals around the leading edge, which requires a comparatively high number of such shroud lines. This results in a certain complexity of the assembly, as well as considerable risks of entanglement and, hence, of non-opening of the canopy.

An object of the invention is to provide a parachute canopy having it marginal surface cut-out in saw-tooth fashion.

This arrangement offers, inter alia, the essential advantage of reducing the shock upon opening by permitting lateral escape between the saw-teeth of the air inflating the canopy. Moreover, the marginal surface that does not take essential part in the parachuting action is, thus, considerably lightened.

A more specific object of the invention is to give to the cut-out marginal surface of the canopy such a shape that each pair of adjacent gores of the same terminates in a saw-tooth portion.

Thus, if the leading edges of the saw-tooth portions and the seams interconnecting the gores are suitably provided with resisting ribbons, it becomes possible, without perturbating the mechanical resistance, or the spreading power of the whole assembly to halve the number of shroud lines and hence the risks of non-opening, as well as the difficulties inherent in assembling or folding the parachute, the said ribbons then acting as shroud lines.

The invention has also for its purpose to increase the parachuting value of a parachute as described above, without modifying the aerodynamic conditions within the canopy. It is therefore another object of the invention to complete the above described parachute canopy by a super-sustaining annular member or skirt mounted outside the canopy around its whole periphery and interconnected with the shroud lines, near the points of the saw-tooth portions.

This combination of a super-sustaining skirt with the saw-tooth marginal surface according to the invention offers the essential advantage that the air escaping laterally between the saw-teeth ensures a rational feeding of the said skirt.

The projected area of the said skirt adds with that of the canopy, which is increased in turn as the said canopy is spread out under the radial component of the pulling action of the said skirt on the shroud lines. There is thus finally obtained an overall projected area considerably increased with respect to that of the same canopy without such a skirt which, in combination with the super-sustaining action of the annular member, ensures a material increase of the parachuting value.

By parachuting value, I mean the ratio between the weight of the parachuted load and the product of the speed of descent of the parachute by the area of cloth used for constructing the canopy.

Still another object of the invention is to provide the gaps between the saw-tooth portions of the canopy and/or the super-sustaining skirt with flexible or elastic grids capable of regulating the air-flow therethrough.

A further object of the invention is to design the super-sustaining skirt in the shape of a hollow annular member inflated with a light gas such as helium to obtain aerostatic action.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 3 is a view of a gore partly assembled of the canopy shown in Fig. 2.

Fig. 4 shows a skirt unit adapted to be assembled with the gore of Fig. 3.

Fig. 5 is a sectional view of one unit of an "aerostatic" super-sustaining skirt.

Figure 1:
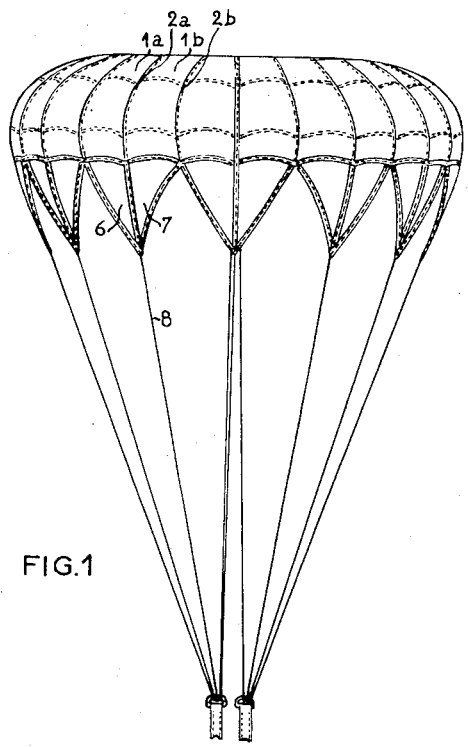
Fig. 1 is an elevational view of a parachute canopy provided with a saw-tooth leading edge according to the invention.

In the embodiment shown in Fig. 1, there are shown at $1a$, $1b$ respectively, two adjacent gores assembled together by means of a seam $2a$, and terminated at their lower end by a saw-tooth portion 6, on the point of which is attached a shroud line 8 of the canopy. The said canopy is constituted by the assembly of a suitable number of gores such as $1a$, $1b$, assembled together in juxtaposed relation by means of seams $2b$.

There is, thus, formed above the circular section of maximum area of the opened canopy, the usual cup-like active portion of the canopy, while the assembly of the saw-tooth portions 6 constitutes a cut-out marginal surface under the said circular section D.

Moreover, according to the invention, the seams $2a$, $2b$ as well as the leading edges 7 of the saw-tooth portions 6 are reinforced by means of ribbons or the like, so as to offer the same mechanical resistance as the shroud lines 8. It is thus possible to omit half the shroud lines, viz. those which would usually be attached to the lower ends of the seams $2b$.

Figure 2:
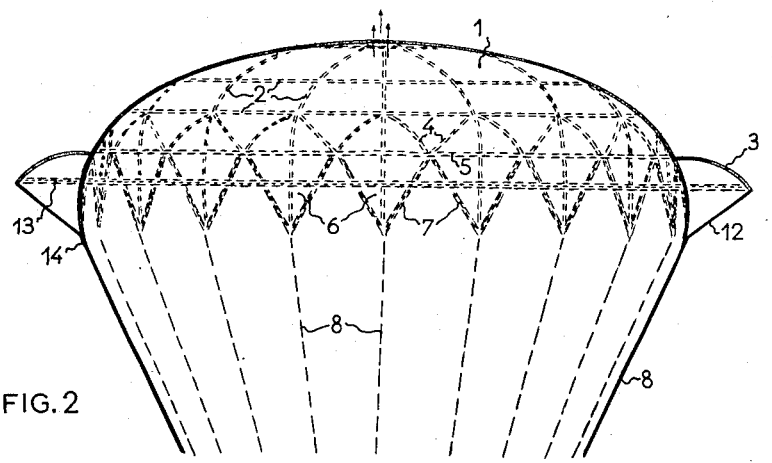
Fig. 2 is a view similar to Fig. 1 of another embodiment in which the parachute canopy is provided with a super-sustaining skirt.

Moreover, the air enclosed under the cup-like active portion of the canopy may escape between the saw-tooth portions 6, which considerably reduce the shock upon opening. In Fig. 2, the number of gores 1 is halved as compared with the embodiment of Fig. 1 and the ribbons $2a$ are substituted for by oblique ribbons 4 interconnecting the top of each triangular cut-out portion comprised between two adjacent saw-tooth portions 6 with the two adjacent ribbons $2b$. In this embodiment, the canopy is completed by a super-sustaining skirt 3 which, in the construction shown, has its upper edge secured e. g. by sewing around the lower periphery of the canopy at the level of the bases of the saw-tooth portions 6.

Moreover, as shown in Fig. 2, a reinforcing ribbon 5 is preferably sewed along the line of attachment of the said skirt upper edge, to make the assembly more resisting.

A preferred mode of assembling of the elements of a gore 1 terminating in a triangular cut-out portion, as described with respect to Fig. 2, is shown in detail in Fig. 3. Zig-zag stitches 10 are provided to affix the shroud lines 8 on the gores 1.

In Fig. 4, there are shown at 11 similar zig-zag stitches for attaching the gathering lines 12 to each unit of the super-sustaining skirt 3. As shown at 13, the leading edge of said skirt is preferably reinforced by a ribbon, while other reinforcing ribbons 4, mounted in cross-fashion, are also preferably provided to increase the mechanical resistance of the said skirt.

As shown in Fig. 2, the leading edge 13 of the super-sustaining skirt 3 is interconnected with the shroud lines 8 of the main canopy through the gathering lines 12 in such a manner that when the parachute is fully open, the skirt 3 projects downwardly with such an incidence that the air, escaping through the triangular cut-out portions of the marginal surface rationally feeds the skirt 3 and ensures its full spreading and inflating, thus giving to the skirt a maximum super-sustaining efficiency. Moreover, this incidence of the skirt 3 causes an increase of the spreading of the main canopy, which also contributes to give to the parachute an optimum parachuting power.

In the alternative embodiment shown in Fig. 5, the super-sustaining skirt is hollowed and constitutes an absolutely tight enclosure 25 mounted around the main canopy in the same manner as the previously described skirt 3. This annular enclosure, which has preferably an aerodynamical shape (wing profile) as shown, is obtained by means of transverse partition members 26, provided with openings 27, ensuring an intercommunication between the compartments thus formed, and fed with a light gas as shown at 28 through flexible ducts 29 mounted along shroud lines 8. The said flexible ducts 29 are fed from light gas containers which may be carried either by the load e. g. on the harness of a parachutist, or by the canopy.

These containers have been omitted on the drawing for simplification purposes, as well as the non-return valves which are preferably interposed on the ducts 29 and triggering means which are provided, if required, to cause automatic opening of the containers upon the deployment of the canopy.

What I claim is:

1. A parachute canopy having a skirt having its upper trailing edge secured around the canopy, said skirt comprising a stream lined hollow annular member provided with means to be fed with a lighter-than-air gas.

2. A parachute canopy adapted to support a suspended load by a plurality of shroud lines connecting said load with the periphery of the canopy, having a skirt having its upper trailing edge secured around the canopy, and a gathering line extending in an axial plane of the canopy to connect the lower leading edge of said skirt with each of said lines, said skirt comprising a stream lined hollow annular member provided with means to be fed with a lighter-than-air gas.

3. A parachute canopy adapted to support a suspended load by a plurality of shroud lines connecting said load with the periphery of the canopy, the marginal surface of the canopy between its circular section of maximum area and its leading edge being curved inwardly by the pull of said lines, and having a skirt having its upper trailing edge secured around the canopy, and a gathering line extending in an axial plane of the canopy to connect the lower leading edge of said skirt with each of said lines, said skirt comprising a stream lined hollow annular member provided with means to be fed with a lighter-than-air gas.

References Cited in the file of this patent

UNITED STATES PATENTS

| | | |
|---|---|---|
| 1,737,913 | Broadwick | Dec. 3, 1929 |
| 1,816,927 | Brown | Aug. 4, 1931 |
| 2,426,926 | Frieder | Sept. 2, 1947 |

FOREIGN PATENTS

| | | |
|---|---|---|
| 874,034 | France | Apr. 13, 1942 |